A (12) United States Patent
Tsuchida et al.

(10) Patent No.: US 11,933,425 B2
(45) Date of Patent: Mar. 19, 2024

(54) LINEAR SOLENOID VALVE

(71) Applicant: AISIN CORPORATION, Aichi (JP)

(72) Inventors: Kenichi Tsuchida, Kariya (JP);
Takahiro Kokubu, Kariya (JP);
Shuichi Takeda, Kariya (JP); Satomi Hoshino, Kariya (JP); Shingo Kurimoto, Kariya (JP)

(73) Assignee: AISIN CORPORATION, Aichi (JP)

( * ) Notice: Subject to any disclaimer, the term of this patent is extended or adjusted under 35 U.S.C. 154(b) by 14 days.

(21) Appl. No.: 17/641,139

(22) PCT Filed: Sep. 30, 2020

(86) PCT No.: PCT/JP2020/037254
§ 371 (c)(1),
(2) Date: Mar. 8, 2022

(87) PCT Pub. No.: WO2021/131213
PCT Pub. Date: Jul. 1, 2021

(65) Prior Publication Data
US 2022/0290779 A1 Sep. 15, 2022

(30) Foreign Application Priority Data
Dec. 25, 2019 (JP) .................................. 2019-233907

(51) Int. Cl.
*F16K 11/07* (2006.01)
*F16K 31/06* (2006.01)
*F16K 47/04* (2006.01)

(52) U.S. Cl.
CPC .............. *F16K 47/04* (2013.01); *F16K 11/07* (2013.01); *F16K 31/0613* (2013.01); *F16K 2200/401* (2021.08)

(58) Field of Classification Search
CPC .. F16K 11/0708; F16K 11/07; F16K 31/0613; F16K 2200/401; F16K 47/04
See application file for complete search history.

(56) References Cited

U.S. PATENT DOCUMENTS

2002/0079002 A1* 6/2002 Ueki .................. F16K 11/0716
137/625.3
2008/0308757 A1 12/2008 Nakai et al.
(Continued)

FOREIGN PATENT DOCUMENTS

JP 2649045 B2 9/1997
JP 11-166641 A 6/1999
(Continued)

OTHER PUBLICATIONS

International Search Report of PCT/JP2020/037254 dated Dec. 22, 2020 [PCT/ISA/210].

*Primary Examiner* — Kelsey E Cary
(74) *Attorney, Agent, or Firm* — Sughrue Mion, PLLC

(57) ABSTRACT

Provided is a linear solenoid valve having at least one notch that opens on an end surface of the land of the spool on the drain chamber side and is formed on an outer peripheral surface of the land. In response to movement of the spool, a state is formed in which the end surface of the land on the drain chamber side is located inside the communication chamber and the output chamber and the drain chamber communicate with each other via the notch and the communication chamber, and a state is formed in which the end surface of the land on the drain chamber side is located inside the output chamber and the output chamber and the drain chamber communicate with each other via the communication chamber.

4 Claims, 7 Drawing Sheets

(56) References Cited

U.S. PATENT DOCUMENTS

2015/0354639 A1 12/2015 Ishikawa et al.
2018/0163888 A1* 6/2018 Ishikawa ................. F16K 3/314

FOREIGN PATENT DOCUMENTS

| JP | 2008-309298 | A | 12/2008 |
| JP | 2020-041599 | A | 3/2020 |
| WO | 2014/156944 | A1 | 10/2014 |

* cited by examiner

LINEAR SOLENOID VALVE

CROSS REFERENCE TO RELATED APPLICATIONS

This application is a National Stage of International Application No. PCT/JP2020/037254, filed Sep. 30, 2020, claiming priority to Japanese Patent Application No. JP 2019-233907, filed Dec. 25, 2019, the entire contents of which are incorporated in their entirety.

TECHNICAL FIELD

The present disclosure relates to a linear solenoid valve including a sleeve including an input port and an output port, a spool slidably arranged in the sleeve, and a solenoid portion for moving the spool in the sleeve.

BACKGROUND ART

Conventionally, as this kind of linear solenoid valve, a linear solenoid valve that includes an arc-shaped or V-shaped input notch (recess portion) formed at an end edge of a land facing an input port of a spool, and an arc-shaped or V-shaped drain notch (recess portion) formed at an end edge of a land facing a drain port is known (for example, see Patent Document 1). In this linear solenoid valve, working oil (fluid) supplied to the input port is introduced into the output port through the input notch and discharged from the drain port through the drain notch. Thus, a change rate in an output pressure with respect to a movement amount of the spool can be brought closer to a proportional relationship, thereby improving the responsiveness of pressure control. On the other hand, as a hydraulic control device including the linear solenoid valve as described above, there is also known a hydraulic control device including a hydraulic damper communicating with an output port of the linear solenoid valve in order to dampen a pulsation of an output pressure of the linear solenoid valve (for example, see Patent Document 2).

RELATED ART DOCUMENTS

Patent Documents

Patent Document 1: Japanese Unexamined Patent Application Publication No. 2008-309298 (JP 2008-309298 A)
Patent Document 2: WO 2014/156944

SUMMARY OF THE DISCLOSURE

Problem to be Solved by Various Aspects of the Disclosure

In the linear solenoid valve as described above, for example, a spool may finely vibrate according to a frequency (drive frequency) of a pulse signal (PWM signal) for controlling a voltage applied to a solenoid portion, and when the spool finely vibrates due to a certain factor, the output pressure pulsates due to the vibration of the spool. Further, in the linear solenoid valve including the input notch and the drain notch, which is described in Patent Document 1, an amplitude of a pulsation of the output pressure becomes larger when the corresponding ports communicate with each other via at least one of the input notch and the drain notch. Thus, when the linear solenoid valve described in Patent Document 1 is used, a pulsation damping device (hydraulic damper) as described in Patent Document 2 may have to be used together with the linear solenoid valve to dampen the pulsation of the output pressure of the linear solenoid valve.

Thus, an aspect of the present disclosure is to provide a linear solenoid valve capable of reducing a pulsation of an output pressure caused by a fine vibration of a spool.

Means for Solving the Problem

The linear solenoid valve of the present disclosure is a linear solenoid valve including a sleeve that includes an input port, an output port, and a drain port, a spool that is slidably arranged in the sleeve, and a solenoid portion that moves the spool in the sleeve in accordance with supplied electric power, in which inside the sleeve, an output chamber communicating with the output port, a drain chamber communicating with the drain port, and a communication chamber that is located between the output chamber and the drain chamber and that has a sectional area smaller than the output chamber are defined, in which the spool includes a land that changes a communication state between the output port and the drain port, in which at least one notch that opens on an end surface of the land on the drain chamber side is formed on an outer peripheral surface of the land, in which the notch is a recess portion that extends in an axial direction of the spool from the end surface of the land on the drain chamber side toward an end surface on an opposite side, and that is recessed from the outer peripheral surface of the land toward an axial center side of the spool, in which in response to movement of the spool, a state is formed in which the end surface of the land on the drain chamber side is located inside the communication chamber and the output chamber and the drain chamber communicate with each other via the notch and the communication chamber, and a state is formed in which the end surface of the land on the drain chamber side is located inside the output chamber and the output chamber and the drain chamber communicate with each other via the communication chamber, and in which a ratio of a total area of the notch viewed in the axial direction to an area of a clearance between an inner peripheral surface of the communication chamber and the outer peripheral surface of the land is 40% or more and 153% or less, and a length of the notch in the axial direction is 21% or more of a lap length that is a difference between a length of the land in the axial direction and a length of the output chamber in the axial direction.

The present inventors performed intensive studies to reduce the pulsation of the output pressure caused by the fine vibration of the spool in the linear solenoid valve including at least one notch formed on the outer peripheral surface of the land so as to open on the end surface of the drain chamber side, and as a result, the present inventors focused on dimensions of the notch formed in the land on the drain chamber side, that is, the area of the notch when viewed in the axial direction of the spool and the length thereof in the axial direction. Then the present inventors found that by setting the ratio of the total area of the notch viewed in the axial direction to the area of the clearance between the inner peripheral surface of the communication chamber and the outer peripheral surface of the land is 40% or more and 153% or less, and setting the length of the notch in the axial direction to 21% or more of the lap length that is the difference between the length of the land in the axial direction and the length of the output chamber in the axial direction, the pulsation of the output pressure caused by the fine vibration of the spool can be satisfactorily reduced while ensuring the flowability of the fluid in the notch. That is, by setting the dimensions of the notch on the drain chamber side within the above range, it is possible to reduce the change in the opening area of the notch in the output chamber with respect to the movement amount (stroke) of the spool, and it is possible to reduce the amplitude of the pulsation of the output pressure in response to the fine vibration of the spool. Thus, according to the linear solenoid valve of the present disclosure, since the pulsation of the output pressure caused by the fine vibration of the spool can be reduced, by omitting a pulsation damping device for damping the pulsation of the output pressure, it is possible to reduce the cost and size of the entire device including the linear solenoid valve. In addition, by providing the notch on the outer peripheral surface of the land of the spool on the drain chamber side, in which the spool forms the above two states, it is possible to satisfactorily dampen the pulsation of the output pressure while shortening the length of the notch in the axial direction and the axial length of the linear solenoid valve. The area of one notch viewed in the axial direction is a value acquired by dividing the total area defined within the above range by the number of notches.

DETAILED DESCRIPTION

Next, embodiments for carrying out the various aspects of the present disclosure will be described with reference to the drawings.

Figure 1:
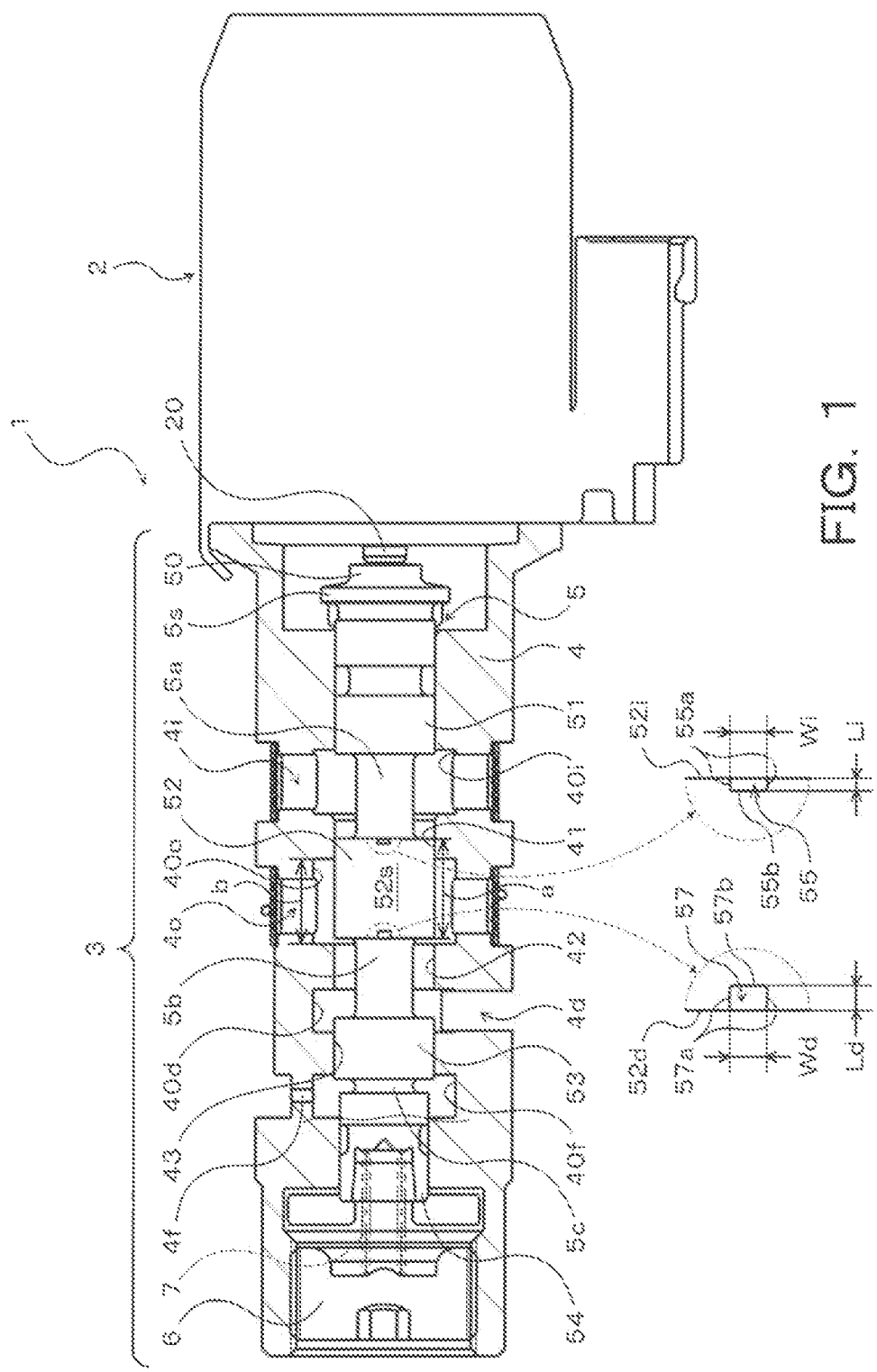
FIG. 1 is a partial sectional view showing a linear solenoid valve of the present disclosure.

FIG. 1 is a schematic configuration view showing a linear solenoid valve 1 of the present disclosure. A linear solenoid valve 1 shown in FIG. 1 is incorporated in, for example, a valve body of a hydraulic control device that controls hydraulic pressure to a clutch, a brake, a torque converter, a lockup clutch, and the like of a transmission mounted on a vehicle. In the present embodiment, the linear solenoid valve 1 is a so-called direct linear solenoid valve that directly supplies regulated working oil to an oil chamber such as a clutch. As shown in the figure, the linear solenoid valve 1 includes a solenoid portion 2 and a valve portion 3 driven by the solenoid portion 2 to regulate working oil. Further, the linear solenoid valve 1 of the present embodiment is a normally closed type linear solenoid valve that outputs hydraulic pressure when electric power is supplied to the solenoid portion 2.

The solenoid portion 2 includes tubular first and second cores arranged side by side in an axial direction, a tubular coil arranged to surround the first and second cores, a plunger that is movably arranged in the second core in the axial direction, a rod 20 that can move in the axial direction in conjunction with the plunger in the first core, and a yoke (case) that accommodates these members (FIG. 1 shows only the rod 20). When a current flows through the coil of the solenoid portion 2, a magnetic flux circuit is formed in which the yoke, the second core, the plunger, and the first core flow in this order. Thus, the plunger is sucked to the first core side, and the rod 20 moves in a direction of protruding from the first core in conjunction with the plunger. In the present embodiment, a voltage applied to the solenoid portion 2 is controlled by a PWM signal generated based on a hydraulic pressure command value.

The valve portion 3 includes a substantially cylindrical sleeve 4 incorporated in the valve body, and a spool 5 that is arranged inside the sleeve 4 so as to be slidable (moveable) in the axial direction. One end of the sleeve 4 (right end in the figure) is fixed to the solenoid portion 2 (yoke), and a cap 6 that closes an end portion (left end in the figure) on the opposite side of the sleeve 4 from the solenoid portion 2 side is fixed (screwed) to the end portion. Further, inside the sleeve 4, a spring (elastic member) 7 is arranged so as to be located between the spool 5 and the cap 6. The spring 7 is a coil spring in the present embodiment, and urges the spool 5 to the solenoid portion 2 side.

The sleeve 4 includes an input port 4$i$, an output port 4$o$, a drain port (discharge port) 4$d$, and a feedback port 4$f$, each of which communicates with a corresponding oil passage formed in the valve body. For example, working oil (line pressure) regulated by a regulator valve after being discharged from an oil pump is supplied to the input port 4$i$. Further, the working oil regulated by the linear solenoid valve 1 flows out from the output port 4$o$ to a hydraulic supply oil passage of the valve body. Further, the drain port 4$d$ communicates with a working oil storage portion through a drain oil passage of the valve body, and the feedback port 4$f$ communicates with the output port 4$o$ through the oil passage formed in the valve body. In the present embodiment, the input port 4$i$, the output port 4$o$, the drain port 4$d$, and the feedback port 4$f$ are formed in the sleeve 4 so as to be arranged in the axial direction at intervals in this order, from the solenoid portion 2 side toward the spring 7 (cap 6) side. That is, the input port 4$i$ is formed on the solenoid portion 2 side of the output port 4$o$. Further, the drain port 4$d$ is formed on the spring 7 side of the output port 4$o$, and is formed on the spring 7 side of the feedback port 4$f$ and the drain port 4$d$.

Further, inside the sleeve 4, an input chamber 40*i* communicating with the input port 4*i*, an output chamber 40*o* communicating with the output port 4*o*, a drain chamber 40*d* communicating with the drain port 4*d*, and a feedback chamber 40*f* communicating with the feedback port 4*f* are defined at intervals in the axial direction. Further, defined inside the sleeve 4 are, a first communication chamber 41 that is located between the input chamber 40*i* and the output chamber 40*o* and that opens to the input chamber 40*i* and the output chamber 40*o*, a second communication chamber 42 that is located between the output chamber 40*o* and the drain chamber 40*d* and that opens to the output chamber 40*o* and the drain chamber 40*d*, and a third communication chamber 43 that opens to the drain chamber 40*d* and the feedback chamber 40*f*. The input chamber 40*i*, the output chamber 40*o*, the drain chamber 40*d*, and the feedback chamber 40*f* are space portions that each have a circular sectional shape and that have the same inner diameter (sectional area). The first to third communication chambers 41, 42, and 43 are space portions that have circular sectional shapes in which the inner diameters (sectional areas) are the same as each other and that are smaller than the inner diameter (sectional area) of the input chamber 40*i* and the like. The input chamber 40*i*, the output chamber 40*o*, the drain chamber 40*d*, the feedback chamber 40*f*, and the first to third communication chambers 41, 42, and 43 extend coaxially with each other along the axial center of the sleeve 4.

As shown in FIG. 1, the spool 5 includes four lands 51, 52, 53 and 54, a first shaft portion 5*a* between the lands 51 and 52, a second shaft portion 5*b* between the lands 52 and 53, and a third shaft portion 5*c* between the lands 53 and 54. The lands 51, 52 and 53 are formed in columnar shapes in which the outer diameters (cross-sectional areas) are the same as each other, and the land 54 is formed in a columnar shape having an inner diameter (cross-sectional area) smaller than the inner diameters (cross-sectional area) of the lands 51 to 53. Further, the outer diameters of the lands 52 and 53 are set to a value slightly smaller than the inner diameters of the first to third communication chambers 41, 42, 43 of the sleeve 4. Further, in the present embodiment, the land 52 of the spool 5 has an axial length longer than the axial length of the output chamber 40*o* of the sleeve 4. The first to third shaft portions 5*a* to 5*c* are each formed in a columnar shape in which the inner diameter (cross-sectional area) is at least smaller than the inner diameter (cross-sectional area) of each of the lands 51 and 52. The lands 51 to 54 and the first to third shaft portions 5*a* to 5*c* extend coaxially with each other along the axial center of the spool 5.

Figure 2:
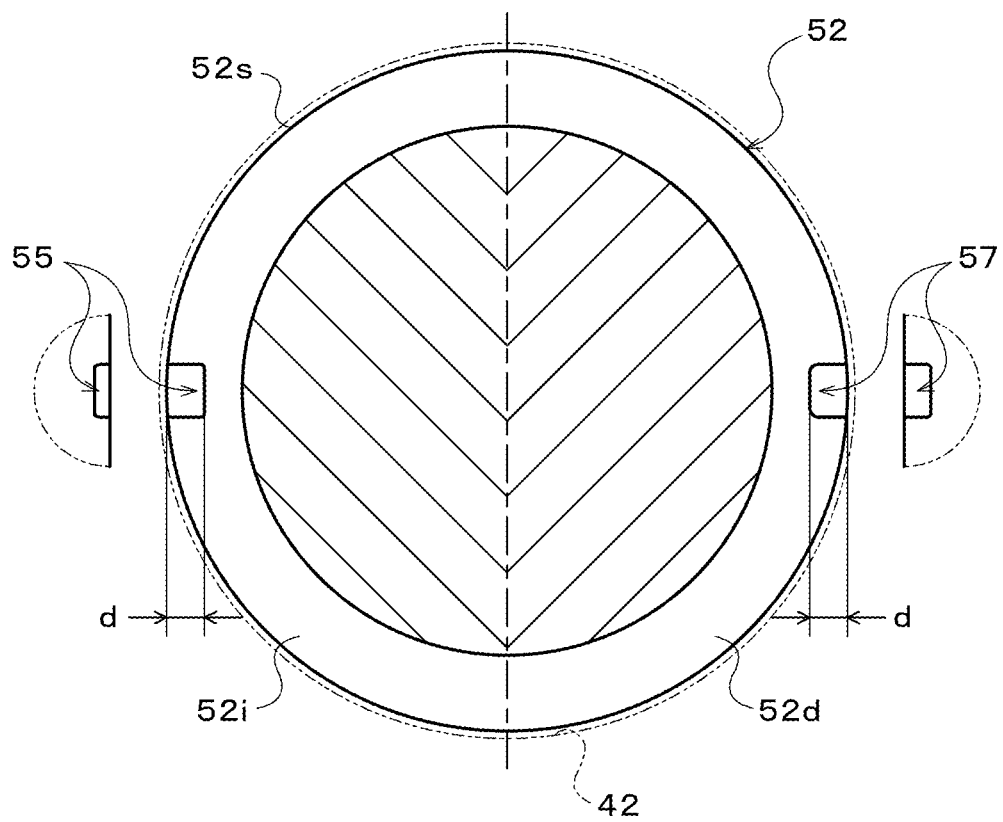
FIG. 2 is a partial sectional view showing a main part of the linear solenoid valve of the present disclosure.

Further, as shown in FIGS. 1 and 2, on an outer peripheral surface 52*s* of the land 52 of the spool 5, at least one input side notch 55 that is a recess portion that opens on an end surface 52*i* of the land 52 on the input chamber 40*i* side (right side in FIG. 1) and at least one drain notch 57 that is a recess portion that opens on an end surface 52*d* of the land 52 on the drain chamber 40*d* side (left side in FIG. 1) are formed. In the present embodiment, the input side notch 55 and the drain notch 57 are each formed at two locations in a circumferential direction at 180° intervals, as shown in FIG. 2. Each input side notch 55 is a recess portion that extends in the axial direction of the spool 5 from the end surface 52*i* of the land 52 on the input chamber 40*i* side toward the opposite side, that is, the end surface 52*d* on the drain chamber 40*d* side, and that is recessed from the outer peripheral surface 52*s* of the land 52 to the axial center side of the spool 5. Further, each drain notch 57 is a recess portion that extends in the axial direction of the spool 5 from the end surface 52*d* of the land 52 on the drain chamber 40*d* side toward the opposite side, that is, the end surface 52*i* on the input chamber 40*i* side, and that is recessed from the outer peripheral surface 52*s* of the land 52 to the axial center side of the spool 5. Further, in the present embodiment, the input side notch 55 and the drain notch 57 have a constant and identical depth d (see FIG. 2), and the paired input side notch 55 and the paired drain notch 57 are arranged on the same axis extending parallel to the axial center of the spool 5. Further, the two (multiple) input side notches 55 have the same specifications as each other, and the two (multiple) drain notches 57 have the same specifications as each other.

As shown in FIG. 1, the input side notch 55 has a substantially rectangular opening portion when viewed edge on. That is, the input side notch 55 includes a pair of side edge portions 55*a*, the side edge portions 55*a* extending parallel to each other and extending in the axial direction of the spool 5 (parallel to the axial center) from the end surface 52*i*, and an inner edge portion 55*b* intersecting with the pair of side edge portions 55*a* and extending in parallel with the end surface 52*i*. Further, as shown in FIG. 2, the input side notch 55 has a substantially rectangular opening portion when viewed in the axial direction of the spool 5 (when the end surface 52*i* is viewed in the front). In the present embodiment, the opening area of the input side notch 55 on the end surface 52*i* is set to be larger than the opening area of the input side notch 55 on the outer peripheral surface 52*s* (see FIG. 2). Further, each corner portion of the input side notch 55 (an intersection portion between the edge portions and the like) has a rounded shape. Thus, the opening area of the input side notch 55 on the outer peripheral surface 52*s* (a projected area of the input side notch 55 with respect to a plane that is parallel to the axial center of the spool 5 and that is orthogonal to a depth direction of the input side notch 55) is acquired by subtracting an area α of a rounded portion applied to the corner portion from the product of a length (a length of the input side notch 55 in the axial direction of the spool 5) Li of the side edge portions 55*a* and a length Wi of the inner edge portion 55*b*.

As shown in FIG. 1, the drain notch 57 also has a substantially rectangular opening portion when viewed edge on. That is, the drain notch 57 includes a pair of side edge portions 57*a*, the side edge portions 57*a* extending parallel to each other and extending in the axial direction of the spool 5 (parallel to the axial center) from the end surface 52*d*, and an inner edge portion 57*b* intersecting with the pair of side edge portions 57*a* and extending in parallel with the end surface 52*d*. Further, as shown in FIG. 2, the drain notch 57 has a substantially rectangular opening portion when viewed in the axial direction of the spool 5 (when the end surface 52*d* is viewed in the front). In the present embodiment, the opening area of the drain notch 57 on the end surface 52*d* is set to be larger than the opening area of the drain notch 57 on the outer peripheral surface 52*s* (see FIG. 2). Further, each corner portion of the drain notch 57 (an intersection portion between the edge portions and the like) has a rounded shape. Thus, the opening area of the drain notch 57 on the outer peripheral surface 52*s* (a projected area of the drain notch 57 with respect to a plane that is parallel to the axial center of the spool 5 and that is orthogonal to a depth direction of the drain notch 57) is acquired by subtracting an area β of a rounded portion applied to the corner portion from the product of a length (a length of the drain notch 57 in the axial direction of the spool 5) Ld of the side edge portion 57*a* and a length Wd of the inner edge portion 57*b*.

As shown in FIG. 1, the land 51 of the spool 5 is slidably arranged in a hole portion (circular hole) formed in the sleeve 4 so as to communicate with the input chamber 40i on the solenoid portion 2 side. Further, at the tip of the land 51 (right end in FIG. 1), a contact portion 50 that is in contact with the rod 20 of the solenoid portion 2, and a stopper portion 5s are formed. Further, the land 54 of the spool 5 is slidably arranged in a hole portion (circular hole) formed in the sleeve 4 so as to communicate with the feedback chamber 40f on the spring 7 (cap 6) side, and the spring 7 is arranged between the land 54 and the cap 6. As a result, the spool 5 is slidably arranged inside the sleeve 4 in a state of being urged toward the solenoid portion 2 by the spring 7. Then, in accordance with the movement of the spool 5, the communication state between the input port 4i and the output port 4o of the sleeve 4 and the communication state between the output port 4o and the drain port 4d of the sleeve 4 are changed by the land 52 of the spool 5.

Figure 3A:
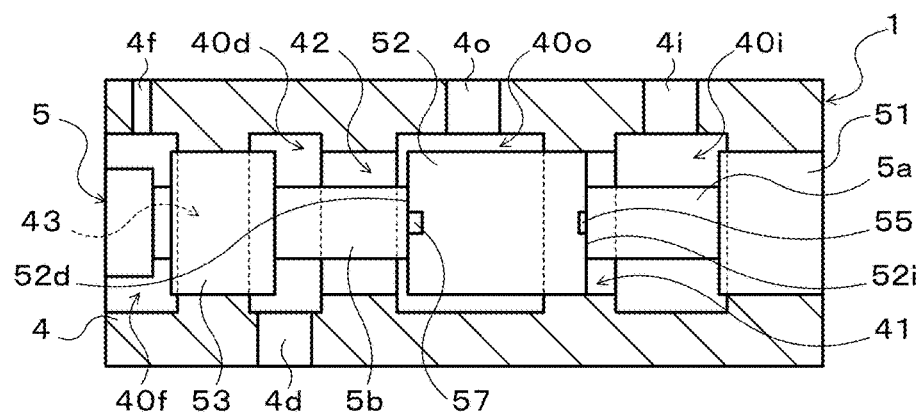
FIGS. 3A, 3B, 3C and 3D are sectional views for describing the operation of the linear solenoid valve of the present disclosure.

In the linear solenoid valve 1 configured as described above, when electric power is not supplied to the coil of the solenoid portion 2, the spool 5 (and the rod 20) is pressed against the plunger of the solenoid portion 2 by the urging force of the spring 7 as shown in FIGS. 1 and 3A. Such a state is referred to as a mounted state of the linear solenoid valve 1. In the mounted state of the linear solenoid valve 1, as shown in FIG. 3A, the end surface 52i of the land 52 of the spool 5 on the input chamber 40i side and the entirety of each input side notch 55 are located in the first communication chamber 41, and the end surface 52d of the land 52 on the drain chamber 40d side is located in the output chamber 40o.

As a result, in the mounted state, the first communication chamber 41 is substantially closed by the land 52, and although working oil may leak via a slight clearance between the outer peripheral surface 52s of the land 52 and the inner peripheral surface of the sleeve 4 that defines the first communication chamber 41, the communication between the input port 4i and the output port 4o is substantially cut off. Further, in the mounted state, due to the end surface 52d of the land 52 being located in the output chamber 40o, the closure of the second communication chamber 42 by the land 52 is released, and the output chamber 40o and the drain chamber 40d are in communication via the second communication chamber 42. Further, in the mounted state, the area of the range in which the working oil is allowed to flow out from the output chamber 40o to the drain chamber 40d is a product value of an outer peripheral length of the land 52 and a distance from the end surface 52d to a boundary between the output chamber 40o and the second communication chamber 42. Further, the state shown in FIG. 3A is continuously formed until the spool 5 moves to some extent after power supply to the coil of the solenoid portion 2 is started. Hereinafter, the state shown in FIG. 3A after power supply to the solenoid portion 2 is started is referred to as a non-pressure-regulating state (fourth state) of the linear solenoid valve 1.

Figure 3B:
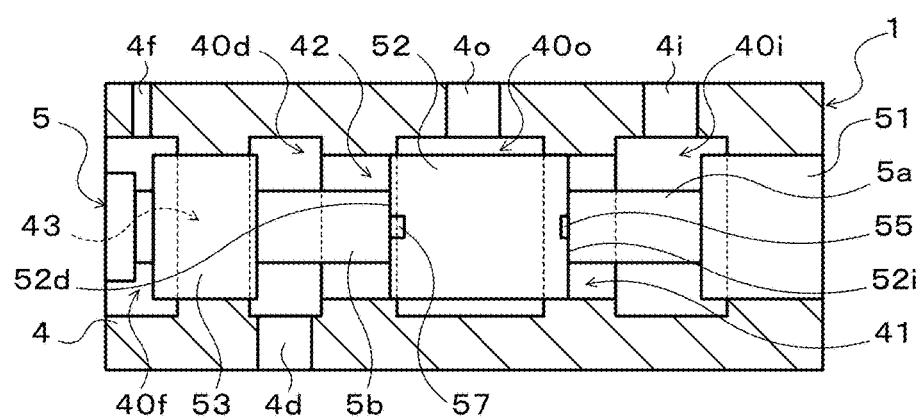

When electric power is supplied to the coil of the solenoid portion 2 and the rod 20 moves to the spring 7 side together with the plunger, the spool 5 is pressed by the rod 20 and resists the urging force of the spring 7 to move to the spring 7 (cap 6) side. In the linear solenoid valve 1, when the spool 5 moves to the spring 7 side, as shown in FIG. 3B, while the end surface 52i of the land 52 on the input chamber 40i side and the entirety of each input side notch 55 remain in the first communication chamber 41, the end surface 52d of the land 52 on the drain chamber 40d side is located in the second communication chamber 42 beyond the boundary between the output chamber 40o and the second communication chamber 42, and each drain notch 57 overlaps with the boundary between the output chamber 40o and the second communication chamber 42 when viewed in the radial direction of the sleeve 4. Such a state is referred to as a minute amount drain state (third state) of the linear solenoid valve 1.

In the minute amount drain state of the linear solenoid valve 1, the output chamber 40o and the drain chamber 40d communicate via each drain notch 57 of the land 52, that is, the range in which each drain notch 57 opens in the second communication chamber 42, and the second communication chamber 42. In the minute amount drain state, the area of the range in which the working oil is allowed to flow out from the output chamber 40o to the drain chamber 40d roughly matches a product value of a distance from the inner edge portion 57b of the drain notch 57 to the boundary between the output chamber 40o and the second communication chamber 42, the length Wd of the inner edge portion 57b, and the number of drain notches 57.

Figure 3C:
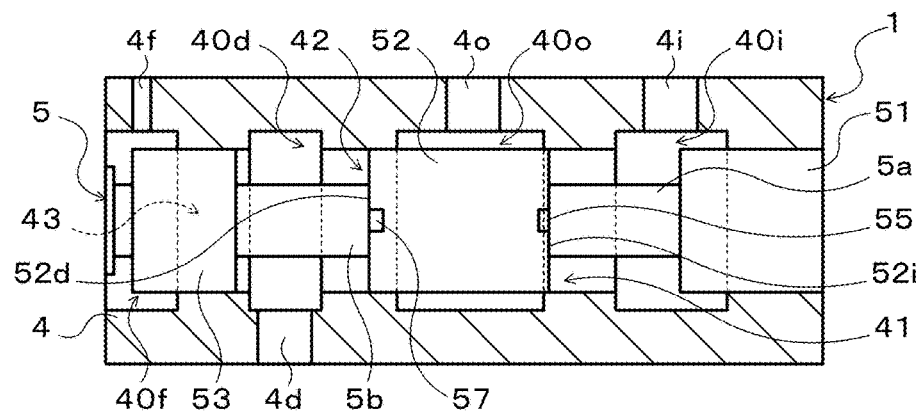

After the minute amount drain state of the linear solenoid valve 1 is formed, when the spool 5 is pressed by the rod 20 and further moves to the spring 7 (cap 6) side, as shown in FIG. 3C, the end surface 52d of the land 52 on the drain chamber 40d side and the entirety of each drain notch 57 are located in the second communication chamber 42, and while the end surface 52i of the land 52 on the input chamber 40i side is located in the first communication chamber 41, each input side notch 55 overlaps with the boundary between the first communication chamber 41 and the output chamber 40o when viewed in the radial direction of the sleeve 4. Such a state is referred to as a first pressure regulating state (first state) of the linear solenoid valve 1.

In the first pressure regulating state of the linear solenoid valve 1, the second communication chamber 42 is substantially closed by the land 52, and although working oil may leak via a slight clearance between the outer peripheral surface 52s of the land 52 and the inner peripheral surface of the sleeve 4 that defines the second communication chamber 42, the communication between the output port 4o and the drain port 4d is substantially cut off. In the first pressure regulating state, the input chamber 40i and the output chamber 40o communicate via each input side notch 55 of the land 52, that is, the range in which each input side notch 55 opens in the output chamber 40o, and the first communication chamber 41. In the first pressure regulating state, the area of the range in which the working oil is allowed to flow in from the first communication chamber 41 (input chamber 40i) to the output chamber 40o roughly matches a product value of a distance from the inner edge portion 55b of the input side notch 55 to the boundary between the first communication chamber 41 and the output chamber 40o, the length Wi of the inner edge portion 55b, and the number of input side notches 55.

Figure 3D:
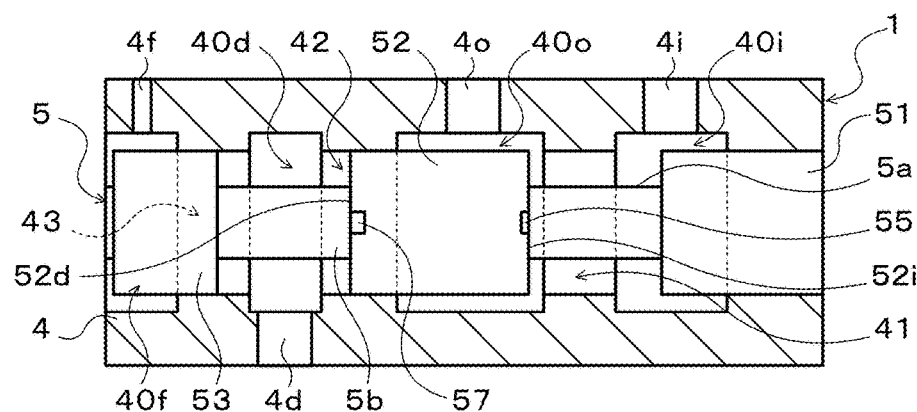

After the first pressure regulating state of the linear solenoid valve 1 is formed, when the spool 5 is pressed by the rod 20 and further moves to the spring 7 (cap 6) side, as shown in FIG. 3D, the end surface 52i of the land 52 on the input chamber 40i side and the entirety of each input side notch 55 are located in the output chamber 40o beyond the boundary between the first communication chamber 41 and the output chamber 40o. Such a state is referred to as a second pressure regulating state (second state) of the linear solenoid valve 1. In the second pressure regulating state of the linear solenoid valve 1, due to the end surface 52i of the land 52 being located in the output chamber 40o, the closure of the first communication chamber 41 by the land 52 is released, and the input chamber 40i and the output chamber 40o are in communication via the first communication chamber 41. In the second pressure regulating state, the area of the range in which the working oil is allowed to flow in from the input chamber 40i to the output chamber 40o is a product value of the outer peripheral length of the land 52 and the distance from the boundary between the first communication chamber 41 and the output chamber 40o to the end surface 52i.

Then, in the linear solenoid valve 1, while the first and second pressure regulating states are being formed, the working oil that flows out from the output port 4o can be regulated to a desired pressure, by balancing a pressing force by the rod 20 generated by the power supply to the coil of the solenoid portion 2, the urging force of the spring 7, and a thrust to the solenoid portion 2 side that acts on the spool 5 by the hydraulic pressure supplied to the feedback port 4f (feedback chamber 40f). Further, when the spool 5 is pressed by the rod 20 and moves to the spring 7 and the stopper portion 5s is in contact with a part of the sleeve 4, the movement of the spool 5 to the spring 7 side is restricted. Further, in the linear solenoid valve 1 of the present embodiment, after the minute amount drain state or the second pressure regulating state is formed in accordance with the movement of the spool 5 until the second pressure regulating state or the minute amount drain state is formed, a state in which the output chamber 40o does not substantially communicate with both the first and second communication chambers 41 and 42 (a state in which the working oil only leaks through the clearance between the land 52 and the sleeve 4) is formed.

Here, also in the linear solenoid valve 1, the spool 5 may finely vibrate due to external factors such as a drive frequency (PWM frequency) of a voltage applied to the solenoid portion 2 and the air in the working oil, and pulsation may occur in an output pressure in the output port 4o due to the vibration of the spool 5. Thus, if no measures are taken in the linear solenoid valve 1, when forming the first pressure regulating state in which the input port 4i and the output port 4o communicate via the input side notch 55, or when forming the minute amount drain state in which the output port 4o and the drain port 4d communicate via the drain notch 57, there is a possibility that an amplitude of the pulsation of the output pressure caused by the fine vibration of the spool 5 becomes large.

Figure 4:
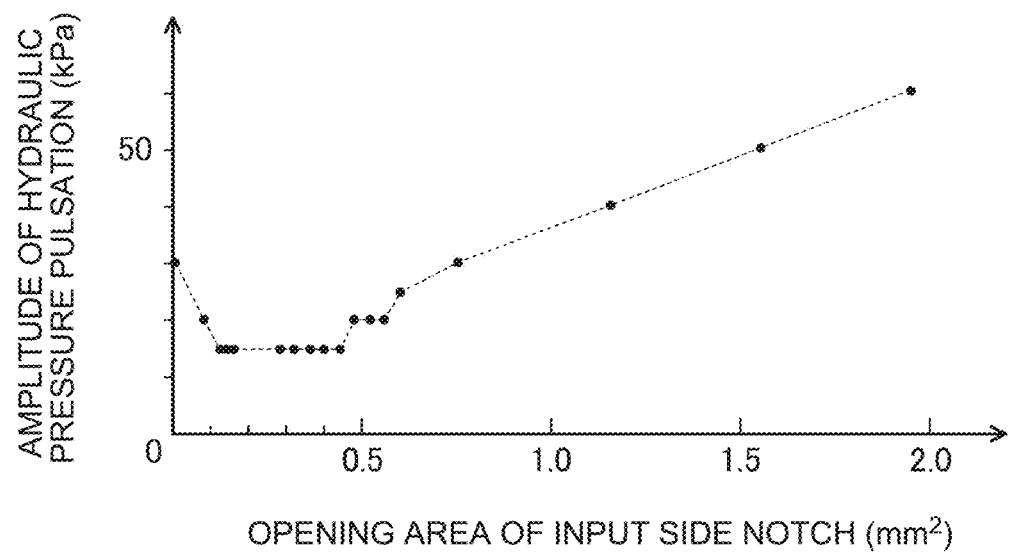
FIG. 4 is a diagram showing the relationship between an opening area of an input side notch on an outer peripheral surface of a land and a pulsation of an output pressure of the linear solenoid valve.
Figure 5:
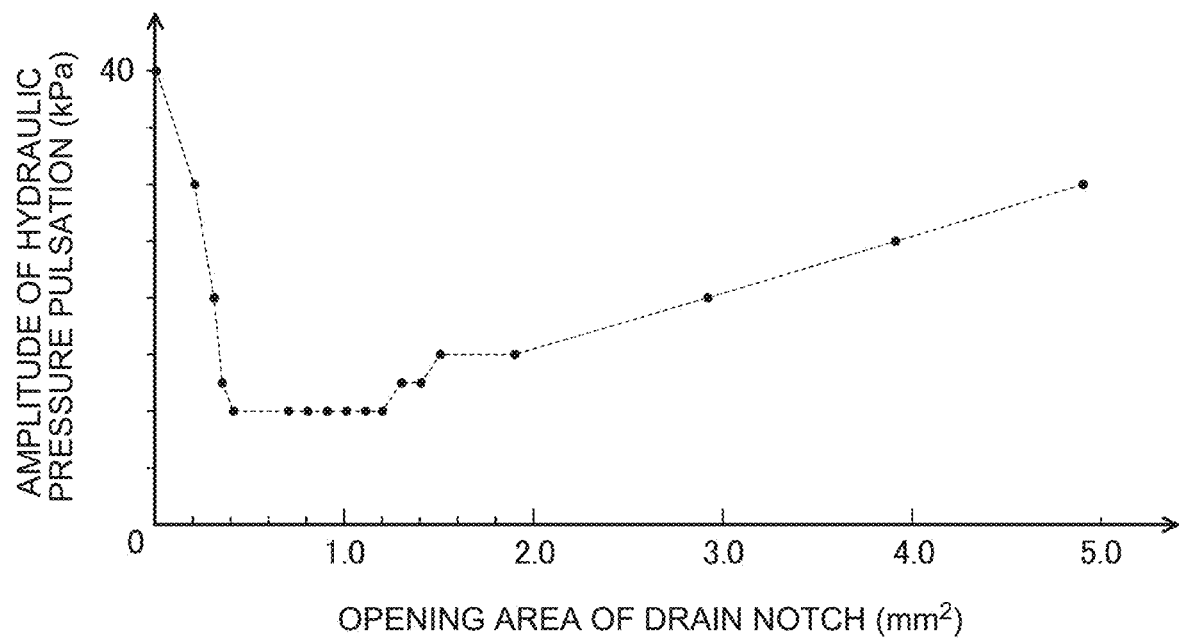
FIG. 5 is a diagram showing the relationship between an opening area of a drain notch on the outer peripheral surface of the land and the pulsation of the output pressure of the linear solenoid valve.

Based on this, the present inventors performed intensive studies to reduce the pulsation of the output pressure caused by the fine vibration of the spool 5 in the linear solenoid valve 1 including the input side notch 55 and the drain notch 57 formed on the outer peripheral surface 52s of the land 52. Then, the present inventors focused on the relationship between the opening areas of the input side notch 55 and the drain notch 57 on the outer peripheral surface 52s of the land 52 and the pulsation of the output pressure of the linear solenoid valve 1, and obtained, by analysis, the relationship between the opening areas of the input side notch 55 and the drain notch 57 and the pulsation of the output pressure when a current to the solenoid portion 2 is changed while the original pressure is constant. FIG. 4 is a chart showing the relationship between the opening area (Li×Wi−α) of the input side notch 55 on the outer peripheral surface 52s of the land 52 and the amplitude (maximum amplitude) of the pulsation of the output pressure. FIG. 5 is a chart showing the relationship between the opening area (Ld×Wd−β) of the drain notch 57 on the outer peripheral surface 52s of the land 52 and the pulsation amplitude (maximum amplitude) of the output pressure.

As shown in FIG. 4, according to the analysis by the present inventors, it was found that by setting the total opening area of the input side notches 55 on the outer peripheral surface 52s of the land 52 (2×[Li×Wi−α] in the present embodiment) to 0.09 mm² or more and 0.57 mm² or less, the amplitude of the pulsation of the output pressure caused by the fine vibration of the spool 5 can be suppressed to about 20 kPa at the maximum and the pulsation can be satisfactorily reduced while ensuring the flowability of the working oil in each input side notch 55. Further, from the analysis results shown in FIG. 4, it is understood that by setting the total opening area of the input side notches 55 on the outer peripheral surface 52s of the land 52 to 0.13 mm² or more and 0.45 mm² or less, the maximum amplitude of the pulsation of the output pressure caused by the fine vibration of the spool 5 decreases to about 15 kPa.

That is, by setting the total opening area of the input side notches 55 on the outer peripheral surface 52s of the land 52 within the range of 0.09 mm² to 0.57 mm², more preferably within the range of 0.13 mm² to 0.45 mm², it is possible to reduce the change in the opening area of each input side notch 55 in the output chamber 40o with respect to a movement amount (stroke) of the spool 5, and it is possible to reduce the amplitude of the pulsation of the output pressure in response to the fine vibration of the spool 5. Based on the analysis result, in the linear solenoid valve 1 of the present embodiment, for example, the length Li of the side edge portion 55a is set to about 0.2 mm, and the length Wi of the inner edge portion 55b is set to about 0.8 mm. The opening area of one input side notch 55 on the outer peripheral surface 52s of the land 52 is a value acquired by dividing the opening area (total) defined within the above range by the number of input side notches 55. Further, it has been confirmed that the above numerical range regarding the input side notch 55 is useful regardless of the size of the spool diameter and the like, when the linear solenoid valve is a linear solenoid valve generally applied to a hydraulic control device of a transmission.

Further, as described above, each input side notch 55 is formed in a substantially rectangular shape when viewed edge on, and includes the pair of side edge portions 55a, the side edge portions 55a extending parallel to each other and extending in the axial direction of the spool 5 from the end surface 52i on the input chamber 40i side. As a result, as shown by a solid line in FIG. 6, since the opening area of the input side notch 55 in the output chamber 40o can be changed to a substantially linear shape with respect to the movement amount (stroke) of the spool 5 when the first pressure regulating state is formed, the fluctuation of the amplitude of the pulsation of the output pressure in response to the fine vibration of the spool 5 can be satisfactorily suppressed. In the present embodiment, the movement amount (stroke) of the spool 5 becomes zero when the stopper portion 5s is in contact with the sleeve 4, and increases as it approaches the solenoid portion 2.

Further, as shown in FIG. 5, according to the analysis by the present inventors, it was found that by setting the total opening area of the drain notches 57 on the outer peripheral surface 52s of the land 52 (2×[Ld×Wd−β] in the present embodiment) to 0.35 mm² or more and 1.45 mm² or less, the amplitude of the pulsation of the output pressure caused by the fine vibration of the spool 5 can be suppressed to about 15 kPa at the maximum and the pulsation can be satisfactorily reduced while ensuring the flowability of the working oil in each drain notch 57. Further, from the analysis results shown in FIG. 5, it is understood that by setting the total opening area of the drain notches 57 on the outer peripheral surface 52s of the land 52 to 0.40 mm² or more and 1.25 mm² or less, the maximum amplitude of the pulsation of the output pressure caused by the fine vibration of the spool 5 decreases to about 10 kPa.

That is, by setting the total opening area of the drain notches 57 on the outer peripheral surface 52s of the land 52 within the range of 0.35 mm² to 1.45 mm², more preferably within the range of 0.40 mm² to 1.25 mm², it is possible to reduce the change in the opening area of each drain notch 57 in the output chamber 40o with respect to a movement amount (stroke) of the spool 5, and it is possible to reduce the amplitude of the pulsation of the output pressure in response to the fine vibration of the spool 5. Based on the analysis result, in the linear solenoid valve 1 of the present embodiment, for example, the length Ld of the side edge portion 57a is set to about 0.5 mm, and the length Wd of the inner edge portion 57b is set to about 0.8 mm. The opening area of one drain notch 57 on the outer peripheral surface 52s of the land 52 is a value acquired by dividing the opening area (total) defined within the above range by the number of drain notches 57. Further, it has been confirmed that the above numerical range regarding the drain notch 57 is also useful regardless of the size of the spool diameter and the like, when the linear solenoid valve is a linear solenoid valve generally applied to a hydraulic control device of a transmission.

Further, as described above, each drain notch 57 is formed in a substantially rectangular shape when viewed edge on, and includes the pair of side edge portions 57a, the side edge portions 57a extending parallel to each other and extending in the axial direction of the spool 5 from the end surface 52d on the drain chamber 40d side. As a result, as shown by a broken line in FIG. 6, since the opening area of the drain notch 57 in the output chamber 40o can be changed to a substantially linear shape with respect to the movement amount (stroke) of the spool 5 when the minute amount drain state is formed, the fluctuation of the amplitude of the pulsation of the output pressure in response to the fine vibration of the spool 5 can be satisfactorily suppressed.

Figure 7:
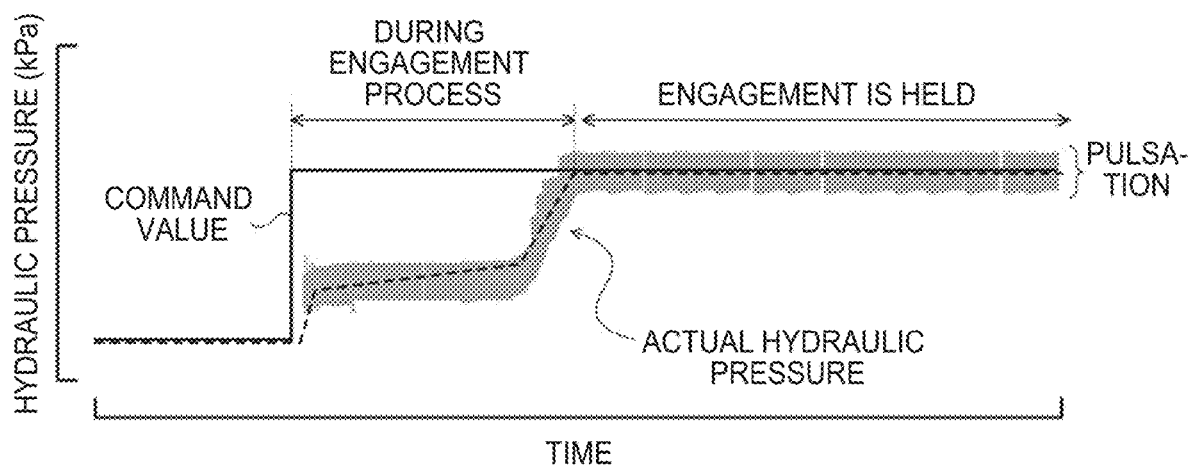
FIG. 7 is a time chart illustrating output characteristics of the linear solenoid valve of the present disclosure.
Figure 8:
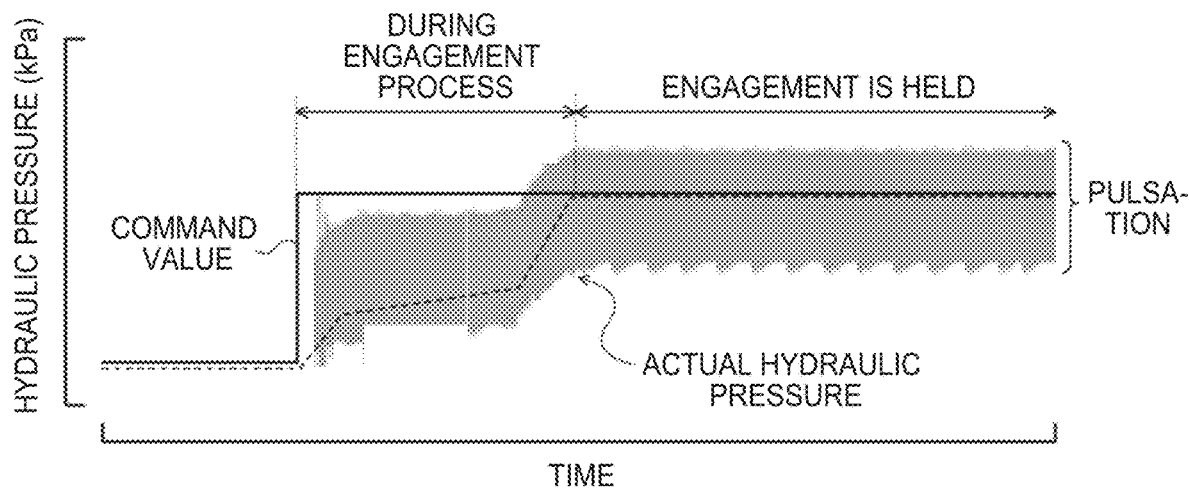
FIG. 8 is a time chart illustrating output characteristics of a linear solenoid valve of a comparative example.

Thus, when regulating the engagement hydraulic pressure with a clutch, brakes, etc. with the linear solenoid valve 1, as shown in FIG. 7, the amplitude of the pulsation of the output pressure during the engagement process (between the start of engagement and the completion of engagement) in which the first pressure regulating state (see FIG. 3C) is formed can be significantly reduced as compared with a case in which a linear solenoid valve including an arc-shaped input side notch as described in Patent Document 1 (see FIG. 8) is used, for example. Further, after the engagement of the clutch and the like is completed, by forming the above-mentioned minute amount drain state (see FIG. 3B) of the linear solenoid valve 1 and holding the engagement hydraulic pressure, it is possible to significantly decrease the pulsation of the output pressure while the engagement hydraulic pressure is held as compared with a case in which a linear solenoid valve including an arc-shaped drain notch is used (see FIG. 8), while ensuring satisfactory responsiveness of the linear solenoid valve 1. As a result, according to the linear solenoid valve 1, since the pulsation of the output pressure caused by the fine vibration of the spool 5 can be reduced, by omitting a pulsation damping device such as a hydraulic damper for damping the pulsation of the output pressure, it is possible to reduce the cost and size of the entire hydraulic control device including the linear solenoid valve 1.

Further, in the linear solenoid valve 1, the input side notch 55 has the constant depth d, and the opening area of the input side notch 55 on the end surface 52i of the land 52 on the input chamber 40i side is set to be larger than the opening area of the input side notch 55 on the outer peripheral surface 52s. Similarly, the drain notch 57 also has the constant depth d, and the opening area of the drain notch 57 on the end surface 52d of the land 52 on the drain chamber 40d side is set to be larger than the opening area of the drain notch 57 on the outer peripheral surface 52s. This makes it possible to specify output characteristics of the linear solenoid valve 1 in the minute amount drain state and the first pressure regulating state by only the opening areas of the input side notch 55 and the drain notch 57 on the outer peripheral surface 52s. As a result, the design of the input side notch 55 and the drain notch 57, and also the linear solenoid valve 1 can be facilitated.

Figure 6:
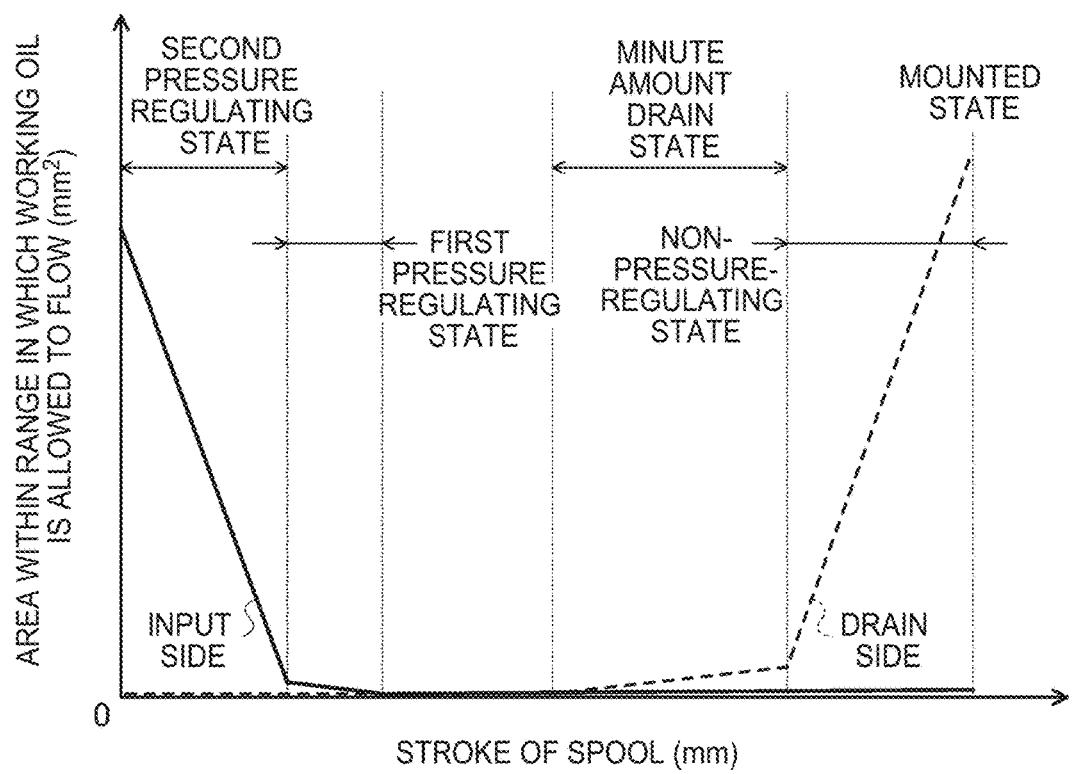
FIG. 6 is a chart showing the relationship between an amount of movement of a spool and an area within a range in which working oil is allowed to flow.

Further, the linear solenoid valve 1 is a normally closed type linear solenoid valve including the spring 7 that urges the spool 5 from the output chamber 40o side to the input chamber 40i side. Then, when the spool 5 is moved by the solenoid portion 2 against the urging force of the spring 7, the non-pressure-regulating state (fourth state), the minute amount drain state (third state), the first pressure regulating state (first state), and the second pressure regulating state (second state) are formed in this order. As a result, in the linear solenoid valve 1, as can be seen in FIG. 6, a state in which the output chamber 40o communicates with both the input chamber 40i (first communication chamber 41) and the drain chamber 40d (second communication chamber 42) via the input side notch 55 and the drain notch 57 is not formed. As a result, in the linear solenoid valve 1, the pulsation of the output pressure in response to the fine vibration of the spool 5 can be satisfactorily reduced.

Figure 9:
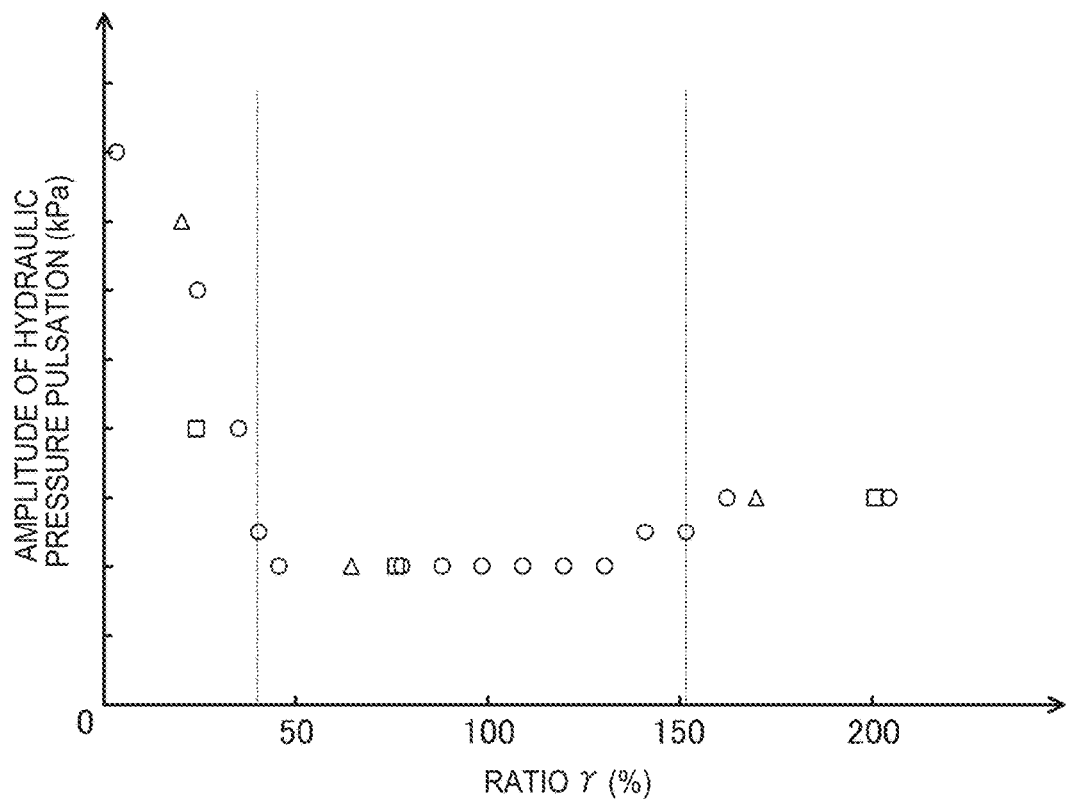
FIG. 9 is a chart showing a relationship between a ratio of a total area of the drain notch viewed in an axial direction to an area of a clearance viewed in the axial direction between an inner peripheral surface of a communication chamber of a sleeve and the outer peripheral surface of the land, and an amplitude of the pulsation of the output pressure.

Further, FIG. 9 shows a relationship between a ratio γ (=the total opening area of the drain notches 57 divided by the area of the clearance) of the total (≈2×Wd×d) area (opening area) of the drain notches 57 viewed in the axial direction to the area (a design value, see FIG. 2) of the clearance between the inner peripheral surface of the second communication chamber 42 of the sleeve 4 and the outer peripheral surface 52s of the land 52 viewed in the axial direction, and the amplitude (maximum amplitude) of the pulsation of the output pressure at the output port 4o. In FIG. 9, a triangular mark indicates a relationship of the ratio γ and the amplitude of the pulsation of the output pressure when the area of the clearance between the inner peripheral surface of the second communication chamber 42 and the outer peripheral surface 52s of the land 52 viewed in the axial direction is relatively large (for example, about 0.57 mm²). Further, in FIG. 9, a circle mark indicates a relationship between the ratio γ and the amplitude of the pulsation of the output pressure when the area of the clearance viewed in the axial direction is a medium degree (for example, about 0.46 mm²). Further, in FIG. 9, a square mark indicates a relationship between the ratio γ and the amplitude of the pulsation of the output pressure when the area of the clearance viewed in the axial direction is relatively small (for example, about 0.36 mm²).

Figure 10:
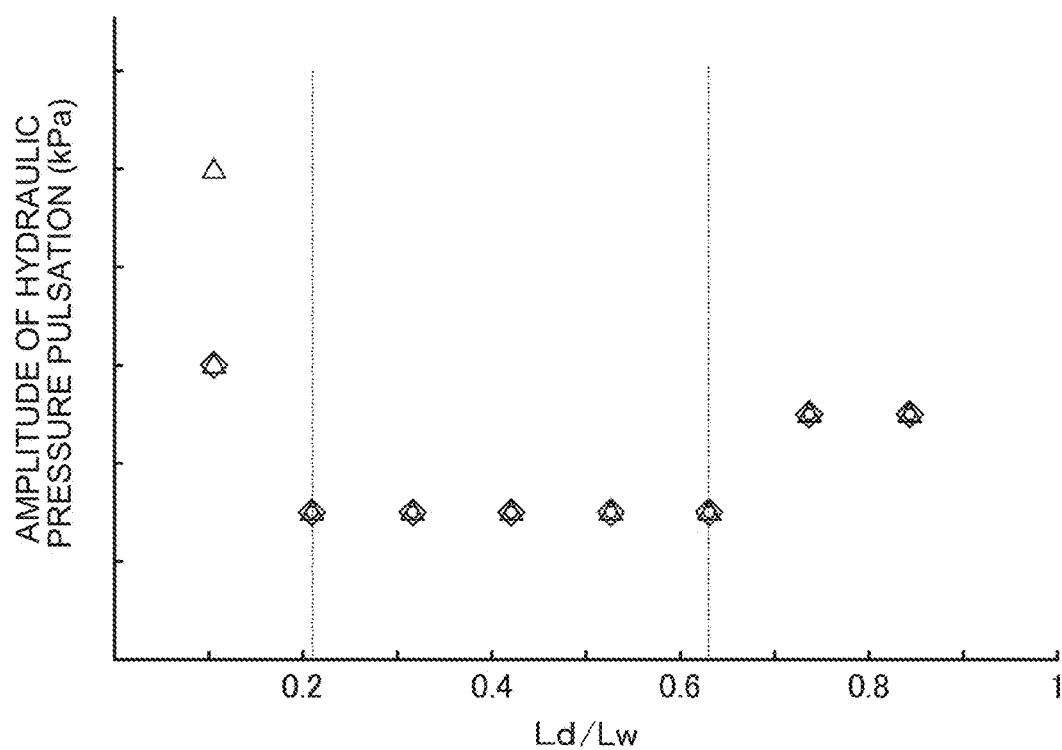
FIG. 10 is a chart showing a relationship between a ratio of a length of the drain notch in the axial direction to a lap length, which is the difference between a length of the land in the axial direction and a length of an output chamber in the axial direction, and the amplitude of the pulsation of the output pressure.

Further, FIG. 10 is a chart showing a relationship between a ratio Ld/Lw of a length Ld of the drain notch 57 in the axial direction to a lap length Lw (=a−b), which is the difference between a length a of the land 52 in the axial direction (see FIG. 1) and a length b of the output chamber 40o in the axial direction (see FIG. 1), and the amplitude of the pulsation of the output pressure in the output port 4o. In FIG. 10, a triangular mark indicates a relationship of the ratio Ld/Lw and the amplitude of the pulsation of the output pressure when the area of the clearance between the inner peripheral surface of the second communication chamber 42 and the outer peripheral surface 52s of the land 52 viewed in the axial direction is relatively large (for example, about 0.57 mm²). Further, in FIG. 10, a circle mark indicates a relationship between the ratio Ld/Lw and the amplitude of the pulsation of the output pressure when the area of the clearance viewed in the axial direction is a medium degree (for example, about 0.46 mm²). Further, in FIG. 10, a square mark indicates a relationship between the ratio Ld/Lw and the amplitude of the pulsation of the output pressure when the area of the clearance viewed in the axial direction is relatively small (for example, about 0.36 mm²).

As shown in FIG. 9, when the ratio γ is 40% or more and 153% or less, the pulsation of the output pressure in the output port 4o can be satisfactorily reduced. Further, as shown in FIG. 10, when the ratio Ld/Lw is 21% or more, preferably 21% or more and 63% or less, the pulsation of the output pressure can be satisfactorily reduced. Further, when the total opening area of the drain notches 57 on the outer peripheral surface 52s of the land 52 is included in the range of 0.35 mm² to 1.45 mm², the ratio γ is included in the range of 40 to 153% and the ratio Li/Lw is included in the range of 21 to 63%. Thus, in the present embodiment, each drain notch 57 is formed so that the ratio γ is 40% or more and 153% or less, and the ratio Ld/Lw is 21% or more, preferably 21% or more and 63% or less. According to the analysis by the present inventors, it is confirmed that when the area of the clearance between the inner peripheral surface of the second communication chamber 42 and the outer peripheral surface 52s of the land 52 viewed in the axial direction is in the range of, for example, 0.20 mm² to 0.80 mm², by forming (designing) the drain notch 57 so that ratio γ and Li/Lw are included in the above range, it is possible to satisfactorily decrease the pulsation of the output pressure in the output port 4o.

A chamfered portion is formed on the outer periphery of the end surface 52i on the input chamber 40i side and the end surface 52d on the drain chamber 40d side of the land 52 by chamfering a portion where the input side notch 55 and the drain notch 57 are not formed. However, since a chamfering radius of the chamfered portion is set to be extremely small, for example, about 0.1 mm, the chamfered portion at the end portion of the land 52 does not substantially reduce the pulsation of the output pressure. Further, while the spool 5 is moving, the linear solenoid valve 1 may be configured so that a state in which the output chamber 40o communicates with both the input chamber 40i (first communication chamber 41) and the drain chamber 40d (second communication chamber 42) via the input side notch 55 and the drain notch 57 is formed. Further, the linear solenoid valve 1 of the present disclosure may be configured as a normally open type linear solenoid valve. Moreover, in the land 52 of the spool 5, a single or three or more input side notches 55 may be formed, or a single or three or more drain notches 57 may be formed. Further, the input side notch 55 and the drain notch 57 may be formed in a substantially isosceles trapezoidal shape in which the longer bottom side is located on the end surface 52i side or the end surface 52d side when viewed edge on.

Figure 11:
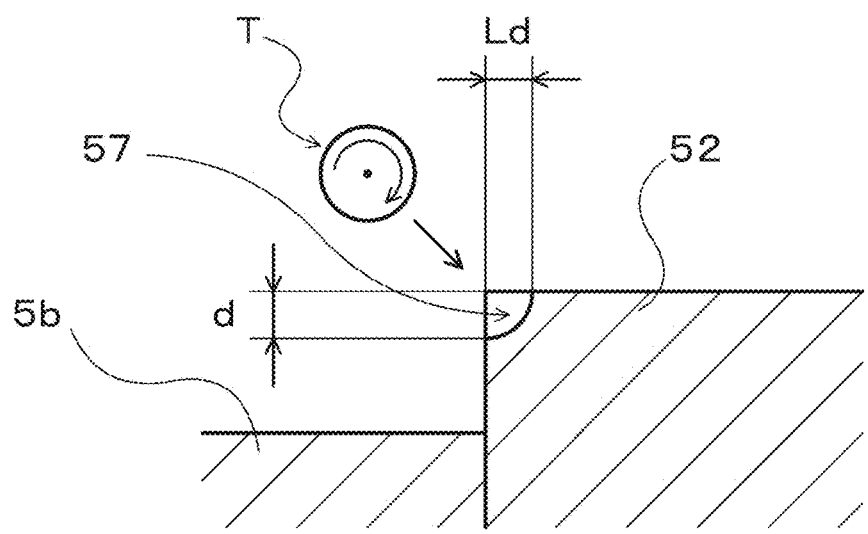
FIG. 11 is a sectional view showing a modification of a notch formed in a land.

Further, as shown in FIG. 11, the length Ld (or Li) of the drain notch 57 (and the input side notch 55) in the axial direction of the spool 5 and the depth d of the drain notch 57 (or the input side notch 55) viewed the axial direction of the spool 5 may be substantially the same, and the drain notch 57 (and the input side notch 55) may be a recess portion having a recess cylindrical bottom surface. The drain notch 57 (and the input side notch 55) shown in FIG. 11 can be easily and quickly formed by using, for example, a cutting tool T having a substantially circular section (short columnar shape) as shown in FIG. 11. By adopting such a drain notch 57 (and the input side notch 55), the manufacturing cost of the linear solenoid valve 1 can be reduced. Further, in the linear solenoid valve 1, the input side notch 55 may be omitted from the land 52.

As described above, the linear solenoid valve of the present disclosure is a linear solenoid valve (1) including a sleeve (4) that includes an input port (4i), an output port (4o), and a drain port (4d), a spool (5) that is slidably arranged in the sleeve (4), and a solenoid portion (2) that moves the spool (5) in the sleeve (4) in accordance with supplied electric power, in which inside the sleeve (4), an output chamber (40o) communicating with the output port (4o), a drain chamber (40d) communicating with the drain port (4d), and a communication chamber (42) that is located between the output chamber (40o) and the drain chamber (40d) and that has a sectional area smaller than the output chamber (40o) are defined, in which the spool (5) includes a land (52) that changes a communication state between the output port (4o) and the drain port (4d), in which at least one notch (57) that opens on an end surface (52d) of the land (52) on the drain chamber (40d) side is formed on an outer peripheral surface (52s) of the land (52), in which the notch (57) is a recess portion that extends in an axial direction of the spool (5) from the end surface (52d) of the land (52) on the drain chamber (40d) side toward an end surface (52i) on an opposite side, and that is recessed from the outer peripheral surface (52s) of the land (52) toward an axial center side of the spool (5), in which in response to movement of the spool (5), a state is formed in which the end surface (52d) of the land (52) on the drain chamber (40d) side is located inside the communication chamber (42) and the output chamber (40o) and the drain chamber (40d) communicate with each other via the notch (57) and the communication chamber (42), and a state is formed in which the end surface (52d) of the land (52) on the drain chamber (40d) side is located inside the output chamber (40o) and the output chamber (40o) and the drain chamber (40d) communicate with each other via the communication chamber (42), and in which a ratio (γ) of a total area of the notch (57) viewed in the axial direction to an area of a clearance between an inner peripheral surface of the communication chamber (42) and the outer peripheral surface of the land (52) is 40% or more and 153% or less, and a length (Ld) of the notch (57) in the axial direction is 21% or more of a lap length (Lw) that is a difference between a length (a) of the land (52) in the axial direction and a length (b) of the output chamber (40o) in the axial direction.

The present inventors performed intensive studies to reduce the pulsation of the output pressure caused by the fine vibration of the spool in the linear solenoid valve including at least one notch formed on the outer peripheral surface of the land so as to open on the end surface of the drain chamber side, and as a result, the present inventors focused on dimensions of the notch formed in the land on the drain chamber side, that is, the area of the notch when viewed in the axial direction and the length thereof in the axial direction. Then the present inventors found that by setting the ratio of the total area of the notch viewed in the axial direction to the area of the clearance between the inner peripheral surface of the communication chamber and the outer peripheral surface of the land is 40% or more and 153% or less, and setting the length of the notch in the axial direction to 21% or more of the lap length that is the difference between the length of the land in the axial direction and the length of the output chamber in the axial direction, the pulsation of the output pressure caused by the fine vibration of the spool can be satisfactorily reduced while ensuring the flowability of the fluid in the notch. That is, by setting the dimensions of the notch on the drain chamber side within the above range, it is possible to reduce the change in the opening area of the notch to the output chamber with respect to the movement amount (stroke) of the spool, and it is possible to reduce the amplitude of the pulsation of the output pressure in response to the fine vibration of the spool. Thus, according to the linear solenoid valve of the present disclosure, since the pulsation of the output pressure caused by the fine vibration of the spool can be reduced, by omitting a pulsation damping device for damping the pulsation of the output pressure, it is possible to reduce the cost and size of the entire device including the linear solenoid valve. In addition, by providing the notch on the outer peripheral surface of the land of the spool on the drain chamber side, in which the spool forms the above two states, it is possible to satisfactorily dampen the pulsation of the output pressure while shortening the length of the notch in the axial direction and the axial length of the linear solenoid valve. The area of one notch viewed in the axial direction is a value acquired by dividing the total area defined within the above range by the number of notches.

Moreover, the length (Ld) of the notch (57) in the axial direction may be 63% or less of the lap length (Lw).

Further, the length (Ld) of the notch (57) in the axial direction and a depth (d) of the notch (57) viewed in the axial direction may be the same.

Further, the total opening area of the notch (57) on the outer peripheral surface (52s) may be 0.35 mm$^2$ or more and 1.45 mm$^2$ or less. Thus, it is possible to reduce the change in the opening area of the notch in the output chamber with respect to the movement amount (stroke) of the spool, and it is possible to reduce the amplitude of the pulsation of the output pressure in response to the fine vibration of the spool.

Further, the total opening area of the notch (57) on the outer peripheral surface (52s) may be 0.40 mm$^2$ or more and 1.25 mm$^2$ or less. As a result, the amplitude of the pulsation of the output pressure in response to the fine vibration of the spool can be made smaller.

Further, the notch (57) may have a pair of edge portions (57a), the edge portions (57a) extending in parallel to each other and extending in the axial direction of the spool (5) from the end surface (52d) on the drain chamber (40d) side. As a result, since the opening area of the notch in the output chamber can be changed to a substantially linear shape with respect to the movement amount (stroke) of the spool, the fluctuation of the amplitude of the pulsation of the output pressure in response to the fine vibration of the spool can be satisfactorily suppressed.

Further, the notch (57) may have a constant depth (d), and the opening area of the notch (57) on the end surface (52s) on the drain chamber (40d) side may be larger than the opening area of the notch (57) on the outer peripheral surface (52s). This makes it possible to facilitate the design of the notch and also linear solenoid valve.

Inside the sleeve (4), an input chamber (40i) communicating with the input port (4i), and another communication chamber (41) that is located between the input chamber (40i) and the output chamber (40o) and that has a sectional area smaller than that of the output chamber (40o) may be defined, in which at least one input side notch (55) that opens on the end surface (52i) of the land (52) on the input chamber (40i) side may be formed on the outer peripheral surface (52s) of the land (52), in which the input side notch (55) may extend in the axial direction of the spool (5) from the end surface (52i) of the land (52) on the input chamber (40i) side toward the end surface (52d) on the opposite side, and may be a recess portion recessed from the outer peripheral surface (52s) of the land (52) toward the axial center side of the spool (5), in which in response to movement of the spool (5), a first state may be formed in which the end surface (52i) of the land (52) on the input chamber (40i) side is located inside the communication chamber (41) and the input chamber (40i) and the output chamber (40o) communicate with each other via the input side notch (55) and the communication chamber (41), and a second state may be formed in which the end surface (52i) of the land (52) on the input chamber (40i) side is located inside the output chamber (40o) and the input chamber (40i) and the output chamber (40o) communicate with each other via the communication chamber (41), and the total opening area of the input side notch (55) on the outer peripheral surface (52s) may be 0.09 mm$^2$ or more and 0.57 mm$^2$ or less. Thus, it is possible to reduce the change in the opening area of the input side notch in the output chamber with respect to the movement amount (stroke) of the spool, and it is possible to reduce the amplitude of the pulsation of the output pressure in response to the fine vibration of the spool.

Further, the opening area of the input side notch (55) on the outer peripheral surface (52s) may be 0.13 mm$^2$ or more and 0.45 mm$^2$ or less. As a result, the amplitude of the pulsation of the output pressure in response to the fine vibration of the spool can be made smaller.

Further, the input side notch (55) may have a pair of edge portions (55a), the edge portions (55a) extending in parallel to each other and extending in the axial direction of the spool (5) from the end surface (52i) on the input chamber (40i) side. Thus, since the opening area of the input side notch in the output chamber can be changed to a substantially linear shape with respect to the movement amount (stroke) of the spool, the fluctuation of the amplitude of the pulsation of the output pressure in response to the fine vibration of the spool can be satisfactorily suppressed.

Further, the input side notch (55) may have a certain depth (d), and the opening area of the input side notch (55) on the end surface (52i) on the input chamber (40i) side may be larger than the opening area of the input side notch (55) on the outer peripheral surface (52s). This makes it possible to facilitate the design of the input side notch and also linear solenoid valve.

Further, the linear solenoid valve (1) may include an elastic member (7) that urges the spool (4) from the output chamber (40o) side to the input chamber (40i) side, and when the spool (4) is moved by the solenoid portion (2) against the urging force of the elastic member (7), the first to fourth states may be formed in the order of the fourth state, the third state, the first state, and the second state. That is, the linear solenoid valve of the present disclosure may be a normally closed type linear solenoid valve, and in such a linear solenoid valve, the pulsation of the output pressure in response to the fine vibration of the spool can be more satisfactorily reduced by suppressing the state in which the output chamber communicates with both the input chamber and the drain chamber via the notch from being formed. However, the linear solenoid valve of the present disclosure may be a normally open type linear solenoid valve.

It is understood that the invention of the present disclosure is not limited to the embodiments described above, and various modifications can be made within the scope of the extension of the present disclosure. Furthermore, the embodiment described above is merely one specific form of the invention described in the SUMMARY OF THE DIS- CLOSURE, and does not limit the elements of the invention described in the SUMMARY OF THE DISCLOSURE.

INDUSTRIAL APPLICABILITY

The invention of the present disclosure can be used in the manufacturing industry of linear solenoid valves and the like.

The invention claimed is:

1. A linear solenoid valve including a sleeve that includes an input port, an output port, and a drain port, a spool that is slidably arranged in the sleeve, and a solenoid portion that moves the spool in the sleeve in accordance with supplied electric power, wherein inside the sleeve, an output chamber communicating with the output port, a drain chamber communicating with the drain port, and a communication chamber that is located between the output chamber and the drain chamber and that has a sectional area smaller than the output chamber are defined, the spool includes a land that changes a communication state between the output port and the drain port, at least one notch that opens on an end surface of the land on a drain chamber side is formed on an outer peripheral surface of the land, the notch is a recess portion that extends in an axial direction of the spool from the end surface of the land on the drain chamber side toward an end surface on an opposite side, and that is recessed from the outer peripheral surface of the land toward an axial center side of the spool, in response to movement of the spool, a state is formed in which the end surface of the land on the drain chamber side is located inside the communication chamber and the output chamber and the drain chamber communicate with each other via the notch and the communication chamber, and a state is formed in which the end surface of the land on the drain chamber side is located inside the output chamber and the output chamber and the drain chamber communicate with each other via the communication chamber, and a ratio of a total area of the notch viewed in the axial direction to an area of a clearance between an inner peripheral surface of the communication chamber and the outer peripheral surface of the land is 40% or more and 153% or less, and a length of the notch in the axial direction is 21% or more of a lap length that is a difference between a length of the land in the axial direction and a length of the output chamber in the axial direction.

2. The linear solenoid valve according to claim 1, wherein the length of the notch in the axial direction is 63% or less of the lap length.

3. The linear solenoid valve according to claim 2, wherein the length of the notch in the axial direction and a depth of the notch viewed in the axial direction are the same.

4. The linear solenoid valve according to claim 1, wherein the length of the notch in the axial direction and a depth of the notch viewed in the axial direction are the same.

\* \* \* \* \*